April 2, 1940.  E. S. RIDLER ET AL  2,195,738
CATALYTIC CONVERTER
Filed March 23, 1938
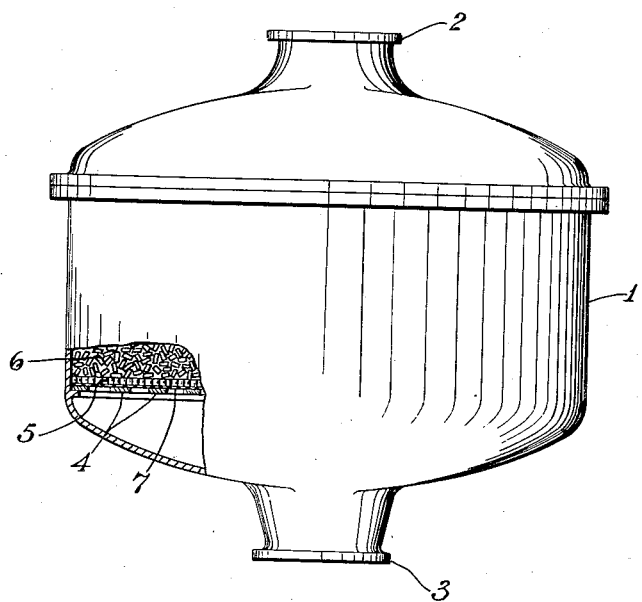
Earl S. Ridler
Arthur S. Weygandt   INVENTORS
BY
Albert B. Griggs   ATTORNEY

UNITED STATES PATENT OFFICE 2,195,738

CATALYTIC CONVERTER

Earl S. Ridler, Bellevue, Del., and Arthur S. Weygandt, Cleveland Heights, Ohio, assignors to E. I. du Pont de Nemours & Company, Wilmington, Del., a corporation of Delaware Application March 23, 1938, Serial No. 197,568

2 Claims. (Cl. 23—288)

This invention relates to a catalytic converter and is more particularly directed to apparatus of low and constant gas resistance for the catalytic conversion of sulfur dioxide to sulfur trioxide.

The catalytic conversion of sulfur dioxide to sulfur trioxide has customarily been effected by passing the sulfur dioxide thru a layer of catalyst. The catalyst layer is ordinarily composed of a carrier upon which is deposited a suitable catalyst such as platinum or vanadium.

The so-called catalyst made up of a catalytic material upon a suitable carrier is ordinarily rather finely divided. For instance, the catalyst may be in the form of small extruded worms or other such small shapes. It is desirable that the catalyst be in a moderately finely divided condition so that a maximum surface will be presented for contact with the reacting gases.

The divided catalytic material within a converter is normally supported as a catalyst layer of some thickness. This support has been effected for instance by providing a perforate metal plate. To prevent the divided catalyst falling thru the perforate plate it has been the practice to provide a screen above the plate. The screen is of a fine enough mesh that the divided catalyst will not pass thru it.

This customary practice of supporting a divided catalyst with a screen has been none too satisfactory because the resistance of a converter so constructed increases after continued use. For instance, a typical catalytic converter of this type when first installed had a resistance of six and six-tenths inches of water when handling a volume of gas equivalent to 13,500 cubic feet per minute at 580° C. After about twenty-four months of operation the resistance of this converter had risen to about twenty-two inches of water under the same conditions of burden and gas temperatures. After a total of thirty-six months of operation the resistance of the converter under the same conditions of burden and temperature reached forty inches of water.

The increase in the gas resistance of a converter of the usual type is attributable to the fact that the screen used to support the divided catalyst becomes stopped up by reason of a sulfation of the wire thus increasing the diameter of the wire and decreasing the size of the interstices. Also, after a screen has been in use for some time and particularly after the size of the openings become smaller, particles may become lodged in the screen thus further increasing resistance to the passage of gases.

The increases of gas resistance in a catalytic converter impairs the operation of a whole converter set and ultimately may become so serious as to require a cessation of operations and a repacking of the converter. The fact that a converter will increase in gas resistance with use has necessitated the design of a whole converter set upon the basis of impaired operation and blowers of unnecessarily great capacity must be installed at the beginning so that after the gas resistance of a converter increases it will still be operable. The increase of gas resistance in a catalytic converter thus causes a loss of capacity for a converter set and increases the power consumption required to handle gases.

It is an object of our invention to provide a converter of low and constant gas resistance. It is a further object of our invention to provide a simple and inexpensive way of overcoming the above discussed disadvantages of catalytic converters without making any radical change in the basic converter design. It is a still further object of our invention to provide a converter the resistance of which will remain substantially unchanged throughout its entire operation. Other objects of our invention will be apparent hereinafter.

The objects of our invention are accomplished by eliminating the screen customarily used to support divided catalyst and by using in lieu thereof a thin layer of an acid resisting material the pieces of which will not pass thru the perforated supporting plate. The acid resisting material should have no openings thru it which are substantially larger than the pieces of catalyst. By thus using a layer of acid resisting material the gas resistance of a converter may be minimized since initially the gas may flow more freely thru the interstices of the acid resisting materials than thru a screen of adequately small mesh. Over a prolonged period of operation the acid resisting material will not clog up as by sulfation and the resistance of a converter will remain substantially unchanged over long periods of time.

Various acid resisting materials may satisfactorily be used and various acid resisting refractories will be found excellent for the purpose. We may for instance use crushed quartz, crushed tile, and any of the numerous acid resisting refractory forms used for the packing of scrubbing towers, gas absorption towers, and the like. One entirely satisfactory material of this type for instance is a magnesium silicate refractory which is made into the form of so-called "rings."

In order that our invention may be better understood reference should be had to the accompanying drawing wherein there is illustrated a converter according to our invention shown partly in section.

In the drawing there will be seen a gas-tight shell 1 within which the catalyst is disposed. This shell is of conventional type, being provided with a gas inlet 2 and a gas outlet 3.

Within the converter there is provided a cast iron grid 4 which serves as a support for the catalyst layer. This grid 4 has quite large openings and upon this grid is supported a perforated cast iron shelf plate 7. This plate 7 is of the type customarily used to support a wire screen.

Immediately above the perforate sheet there is disposed a layer of magnesium silicate rings 5. These rings are larger than the openings in the perforate plate 7 and therefore will not fall thru. The rings 5 are cylinders eight-tenths of an inch high and eight-tenths of an inch in diameter. In the cylinder are four curved partitions extending axially. The largest opening thru a ring is less than three-sixteenths of an inch wide. The rings are located as shown in a single layer with their axes vertical. With the rings thus located the spaces between the rings are too small to permit passage of three-sixteenths inch diameter cylinders.

Supported upon the layer of acid resisting material 5 is a catalyst layer 6. This for instance may be a layer of silica worms which carry platinum. The silica worms are about three-sixteenths of an inch in diameter and average about half an inch long. Some of the worms are broken so there are fairly short cylinders present and some of the worms are longer than half an inch. The interstices extending thru the layer of rings 5 provide no openings which are large enough for the passage of the divided catalyst 6 and the layer 5 therefore serves effectively to prevent passage of catalyst while permitting free passage of gases.

A catalytic converter such as that shown in the drawing and described above was operated over a period of months. At the beginning of operations the gas resistance of the converter was somewhat higher than the resistance of the above described prior art type of converter by reason of the type of packing used and the amount of catalyst. Under substantially the same conditions of operation as above described and with a gas flow of about 13,500 cubic feet per minute at a temperature of about 580° C. the converter of our invention had an initial gas resistance of about eight and two-tenths inches of water. After twenty-four months of operation the resistance of the converter under the same conditions was only ten inches of water. It will be seen that with a catalytic converter constructed according to our invention, there is only a negligible rise in gas resistance over a period of two years continuous operation as compared with the previously used type of catalytic converter which in two years' time more than trebled its resistance to the passage of gases.

While we have shown a specific construction it will be understood that this is illustrative and that the purposes of our invention may be achieved in various equivalent ways.

The layer of acid resisting material may be made up of pieces of any desired shape which are larger than the holes in the perforate plate. The pieces of acid resisting material should not be too large since in that event the divided catalyst might find a way thru to the perforate plate and thence out of the converter. It will in general be found a simple matter to provide a layer of acid resisting material of a size only slightly greater than the perforations in the plate in such a way that the catalyst will effectively be supported.

While we have shown certain illustrative embodiments of our invention, it will be understood that one skilled in the art may readily devise numerous specific forms of equivalent apparatus without departing from the spirit of our invention.

We claim:

1. A catalytic converter for the oxidation of sulfur dioxide to sulfur trioxide the converter having a low and constant gas resistance and comprising a gas-tight shell, a perforate retainer plate located within the shell, a layer of divided acid-resistance magnesium silicate refractory disposed upon the perforate plate and the pieces of refractory being so large that they will not pass thru the perforations of the said perforate plate, and a layer of divided catalyst located above and supported upon the said layer of refractory, the interstices thru the refractory being too small to permit passage of the catalyst while being large enough to permit relatively unimpeded flow of gases.

2. A catalytic converter for the oxidation of sulfur dioxide to sulfur trioxide the converter having a low and constant gas resistance comprising a gas-tight shell, perforate retainer plate located within the shell, a layer of acid-resistant magnesium silicate refractory rings about eight-tenths of an inch high and about eight-tenths of an inch in diameter and having interior axial partitions the holes in the perforate retainer plates being smaller than the magnesium silicate rings, and a layer of catalyst in the form of cylinders about three-sixteenths of an inch in diameter and averaging about a half an inch in length the catalyst being located above and supported upon the said layer of magnesium silicate rings and the interstices thru the rings being too small to permit passage of the catalyst while being large enough to permit relatively unimpeded flow of gases.

EARL S. RIDLER.
ARTHUR S. WEYGANDT.